United States Patent
Raffel et al.

[11] 4,050,896
[45] Sept. 27, 1977

[54] METHOD AND APPARATUS FOR THE PRODUCTION OF REACTION MIXTURES FROM LIQUID REACTION COMPONENTS

[75] Inventors: Reiner Raffel, Siegburg; Wilfried Ebeling, Cologne; Klaus Nadolski; Klaus Schulte, both of Leverkusen, all of Germany

[73] Assignees: Maschinenfabrik Hennecke GmbH; Bayer Aktiengesellschaft, both of Leverkusen, Germany

[21] Appl. No.: 722,900

[22] Filed: Sept. 13, 1976

[30] Foreign Application Priority Data
Sept. 27, 1975 Germany ............................. 2543302

[51] Int. Cl.² .......................... G01F 1/86; G01F 1/88; G01N 9/26
[52] U.S. Cl. ................ 23/230 A; 23/253 A; 73/195
[58] Field of Search .............. 23/230 A, 253 A; 73/195, 199; 260/698

[56] References Cited
U.S. PATENT DOCUMENTS

| | | | |
|---|---|---|---|
| 2,538,824 | 1/1951 | Andresen, Jr. ........................ | 73/195 |
| 3,062,271 | 11/1962 | Rijnsdorp .............................. | 73/195 |
| 4,009,614 | 3/1977 | Sheppard et al. ..................... | 73/195 |

Primary Examiner—R.E. Serwin
Attorney, Agent, or Firm—Gene Harsh; Joseph C. Gil

[57] ABSTRACT

The instant invention is directed to a method and apparatus for measuring the proportion of undissolved gas in a liquid component for the production of foam materials, particularly, those based on polyurethane. The method is based on the equation of state of ideal gases (Boyle-Mariot Law: $P \cdot V = $ constant) at constant temperatures. The gas contained in a liquid component charged with gas increases its volume under expansion according to the above equation. The gas expansion causes expansion of the liquid gas mixture. The difference in the volumetric flow rate of the liquid, at two differing pressures, is therefore a measurement of the quantity of gas present in the liquid. The apparatus consists of one volumetric flow rate measurement unit connected upstream of a pressure drop unit, a second volumetric flow rate measurement unit connected downstream of the pressure drop unit and a differential value indicator connected to the first and second volumetric flow rate measurement units.

12 Claims, 4 Drawing Figures

METHOD AND APPARATUS FOR THE PRODUCTION OF REACTION MIXTURES FROM LIQUID REACTION COMPONENTS

BACKGROUND OF THE INVENTION

The present invention relates to a method and apparatus for the production of reaction mixtures from liquid reaction components for the production of foam materials.

In order to induce cell formation in the foaming reaction, a specific quantity of a gas, such as air, must be contained in the reaction mixture in the form of fine bubbles which serve as nuclei in the foaming reaction. Depending on the varying desired foam materials a varying quantity of gas is required for this nucleus formation.

For this purpose, a gas such as air is introduced into one of the reaction components which carries the gas with it into the mixing chamber or the gas is introduced directly into the mixing chamber. The first mentioned method has been carried out in the past because in the decompression of the component charged with gas in the mixing chamber, the gas is distributed better. The term "gas charge" of the reaction component is used. This is understood to mean the quantity of gas which is contained in the reaction component in the form of undissolved, finely distributed gas bubbles.

Air or other gas may be introduced into a reaction component (in the case of polyurethane foamable reaction mixtures preferably into the polyol component) for example, by means of a mixing lance or by means of a fast running agitator in the storage container. Gas or air may also be added through porous metal plates or injection nozzles via a dosing device into the reaction component or into a premixing chamber. Finally the components may also be circulated by means of pumps and the return flow is introduced into the gas chamber of the storage container which is under supply pressure and thus absorbs gas.

All these methods are extremely inaccurate and uncertain and hitherto have been carried out purely according to trial and error. Therefore, in previous methods, control of the gas was extremely unstable. The only control was the visual evaluation of the finished product. If, in structural hard cellular plastic the color was dark brown, then it contained too little gas. If the color was light brown, the gas proportion had been correctly selected. If it was light brown with surface bubbles then it contained an excess of gas.

The object of the present invention is therefore to provide a method and apparatus with which the gas charge is measurable, i.e., measurable so as to be reproducible.

In addition, where possible, the gas charge should be automatically controllable.

DESCRIPTION OF THE INVENTION

Figure 1:
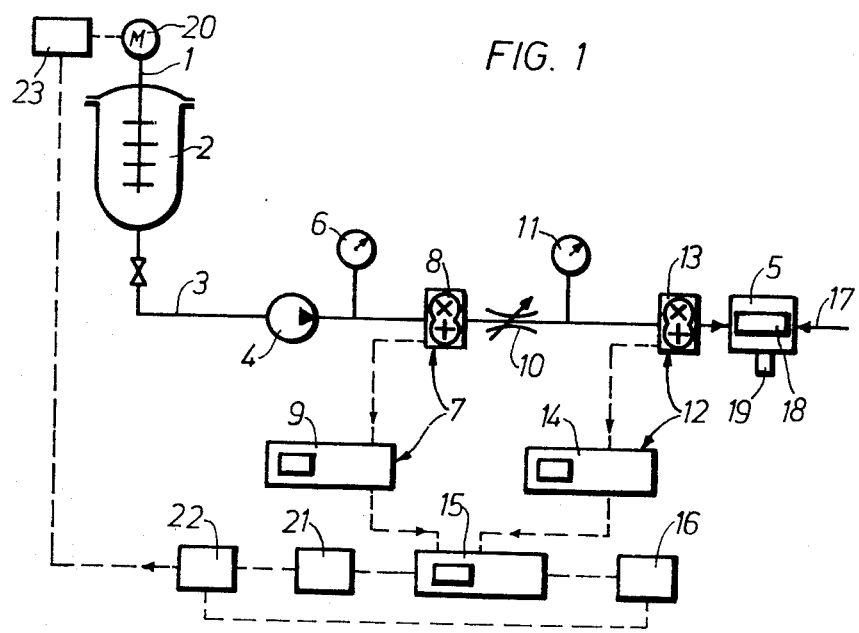
FIG. 1 shows a first embodiment of an apparatus according to the invention having a throttle valve as the pressure drop unit.

According to the invention, there is provided a method for the production of reaction mixtures from liquid reaction components, comprising charging one of the reaction components with a gas, measuring the volumetric flowrate of the reaction component charged with gas at a first pressure level, bringing the reaction component charged with gas to a second pressure level, measuring the volumetric flowrate at said second pressure level whereby the differential value of the measured volumetric flowrate is a measurement for the gas charge and mixing the gas charged component with the remaining reaction components.

The method is based on the equation of state of ideal gases (Boyle-Mariot Law: $p \cdot V$ = constant) at a constant temperatures. For instance, the gas contained in a polyol charged with gas, when decompressed, increases in volume according to the above mentioned equation. The gas expansion thereby causes expansion of the polyol-gas mixture. Consequently the volumetric flowrate of the polyol-gas mixture in liters/minute is lower at 100 bars working pressure than it is at a compression of only 1 bar. The difference between the volume flow rates is thus a measurement for the gas quantity in the polyol.

One can assume that the temperature of the reaction component hardly changes between the two measurement points. Because the temperature difference is negligible, it does not affect the accuracy of the measurement.

According to the particular embodiment of the method according to the invention, reaction components are recycled in known manner during pause times, in which no mixing takes place. The second measurement of the volumetric flowrate is conducted during the recycling. This has the advantage that it is determined whether the gas charge corresponds to the ideal value before mixing.

Preferably, the first pressure level should be higher than the second, although, the first pressure level can be lower than the second. The method of operation is chosen according to the particular apparatus used for carrying out the method.

One embodiment of the method according to the invention provides not only for the measurement of the gas charge, but also for its regulation. This takes place according to the invention by comparing the differential value of the volumetric flowrate measured with a predetermined ideal differential value and adjusting the quantity of gas to be added so as to adhere to the ideal value.

It is clear that the ideal value is a characteristic ideal value which must be determined for each foam material system. This can be done by evaluating the cell structure and by means of corresponding experiments with regard to mechanical strength or other characteristic values of the product samples.

According to the invention there is provided an apparatus for the production of reaction mixtures from liquid reaction components which apparatus has at least two feed streams carrying the separate reaction components to a mix head and at least one stream has a gas inlet. The improvement in a gas charge measurement means which comprises a first volumetric flow rate measurement unit in each feed stream having a gas inlet downstream of said gas inlet, a pressure drop unit in each feed stream having a gas inlet downstream of each first volumetric flow rate measurement unit and a second volumetric flow rate measurement unit in each feed stream having a gas inlet downstream of each pressure drop unit but before the mix head, and a differential value indicator connected to each of said first and second flow rate measurement units.

The feed system for the components generally includes in each case a storage container, a pipe to the mixing head, in which a dosing pump is arranged and optionally a return pipe to the storage container. Suitable volumetric flowrate measurement devices are known and include in particular gear flow meters, oval wheel meters, turbine or rotary piston meters, Suitable pressure drop units are known and include throttle valves or in a preferred case the dosing pump itself, in which case no further means are required to produce the necessary pressure drop. The gas feed device may consist, for example, of an agitator in the storage container or of a gas pipe opening into the pipe leading into the mixing head. This gas pipe must open into the feed pipe upstream of the first volumetric flowrate measurement unit.

According to a particular embodiment of the apparatus according to the invention, return flow pipes are provided and the second volumetric flowrate measurement unit is arranged in the return flow pipe. This has the advantage that the component can be checked during pause times in which mixing does not take place and the reactants recirculate, so that the correct gas charge is present when the mixing process takes place.

On the basis of the indicated gas charge, the charge can be corrected by activating the gas feed mechanism, as soon as the gas charge deviates from the predetermined ideal value.

According to a particular embodiment, the apparatus according to the invention provides the possibility for automatic control, by making the differential indicator unit a part of a control circuit consisting of a measurement value converter, regulator, servo-motor and a regulating unit connected to the gas feed pipe mechanism. The regulator unit, which is actuated by the servo-motor as a function of the value displayed can for example comprise the drive mechanism for an agitator in the storage container. If the gas charge is too low, the drive mechanism is adjusted to provide a higher agitator rotational speed; if the gas charge is too high, the drive mechanism is adjusted to provide a lower agitator rotational speed. If a gas feed pipe is used with a flow regulation value then this valve constitutes the regulating unit. It can be regulated by the servomotor to allow either a higher or lower gas feed.

If the method and the apparatus according to the invention are used for both reaction components, and generally only two main components are used, to which the necessary additives have already been added, then the ratios of the components can be continuously and simultaneously checked using the values indicated by the volume flow measurement unit.

Four embodiments of the apparatus according to the invention are shown schematically and by way of example in a drawing and are further described below.

In FIG. 1, a reaction component is pumped out of a storage container 2, equipped with an agitator mechanism 1, via a pipe 3; by means of a dosing pump 4 to a mixing head 5. Downstream of the dosing pump 4 there is arranged a first manometer 6 and a first volumetric flowrate measurement unit 7, consisting of gear flowmeter 8 and an indicator unit, 9. In pipe 3, downstream of the volume flowrate measurement unit 7, a throttle valve is arranged as the pressure drop unit 10. It is followed by a second manometer 11 and a second volumetric flowrate measurement unit 12, consisting of a gear flowmeter 13 and an indicator unit 14. The indicator units 9, 14 are connected to a differential value indicator unit 15 with an ideal value indicator 16. A pipe 17 for a second reaction component opens into the mixing head 5. The mixture leaves the mixing chamber 18 of the mixing head 5 through an outlet 19. For manual regulation this configuration of the apparatus is already adequate, since the drive mechanism 20 of the agtator mechanism 1 is controlled in respect to its rotational speed. However, for automatic regulation, the differential value indicator unit 15 is connected with a measurement value converter 21, which actuates a servo-motor 23 via a regulator 22 as a function of the comparison of the differential value with the ideal value, the servo-motor again controlling the drive mechanism 20 of the agitator mechanism 1.

The method of operation of this apparatus is as follows. The reaction component, a polyol, runs out of the storage container 1 into the pipe 3. The dosing pump 4 brings the polyol up to a pressure of, e.g., approximately 100 bars, which is indicated by the manometer 6. At this pressure the volumetric flowrate is measured by means of the gear flowmeter 8 and indicated by the unit 9 as, e.g., 10.03 liters/minute. In the throttle valve 10, the polyol is decompressed to approximately 1 bar, as is measured by the manometer 11. The second gear flowmeter 13 again measures the volumetric flowrate which is indicated as 10.52 liters/minute. The differential value of 0.49 liters/minute is given by the differential value indicator unit 15. This value is characteristic for the gas charge. It almost agrees with the assumed ideal value of 0.5 liters/minute. If the gas charge were too high, the rotational speed of the drive mechanism of the agitator mechanism 1 would be reduced via the regulation circuit. If it were too low, the rotational speed of the drive mechanism would be increased so as to include more air. An isocyanate without gas charge is fed through the pipe 17 as the second reaction component.

Figure 2:
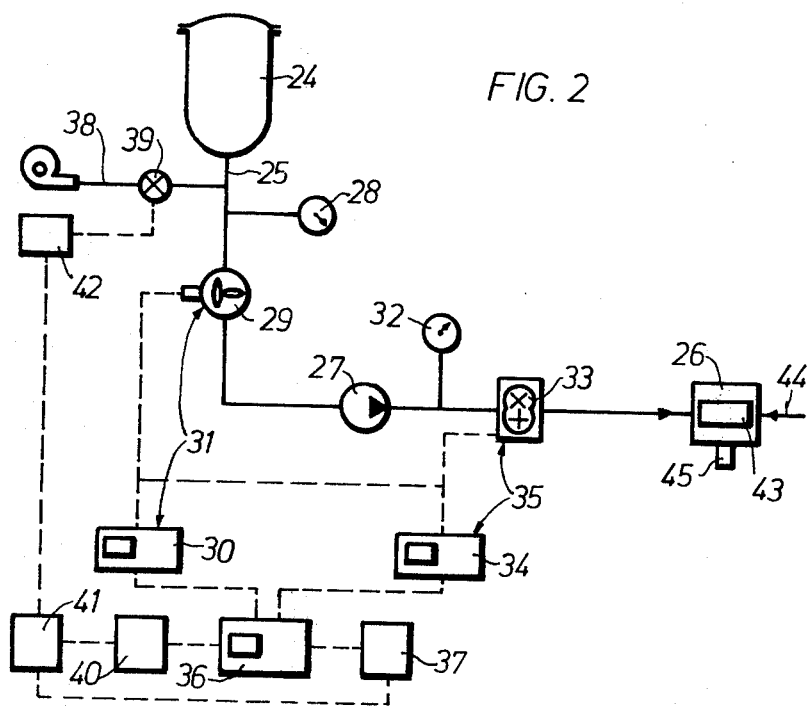
FIG. 2 shows a second embodiment having a dosing pump as the pressure drop unit.

In FIG. 2 the reaction component, a polyol is pumped out of the storage container 24 via a pipe 25 to the mixing head 26. Upstream of the dosing pump 27, which constitutes the pressure drop unit, a manometer 28 and a volumetric flowrate measurement unit 31 consisting of an oval wheel flowmeter 29 and an indicator unit 30, are arranged. A second manometer 32 and a second volumetric flowrate measurement unit 35 consisting of a gear flowmeter 33 with indicator unit 34 are arranged downstream of the dosing pump 27. The indicator units 30, 34 are connected to a differential value indicator unit 36 to which an ideal value indicator 37 is connected. A gas feed pipe 38, containing a regulator valuve 39 opens into pipe 25, upstream of the oval wheel flowmeter 29. Depending on the indication of the differential value indicator unit 36, the regulator valve 39 can be adjusted for a higher or lower gas input. However, for automatic regulationn, a measurement value converter 40, connected to the differential value indicator unit 36, is provided, which actuates the regulator valve 39 via a regulator 41 and a servo-meter 42. The regulator 41 is thus connected to the ideal value indicator 37. A pipe 44 for an isocyanate as the second reaction component opens into the mixing chamber 43 of the mixing head 26. Finally, the reaction mixture leaves the mixing chamber 43 via an outlet 45.

Figure 3:
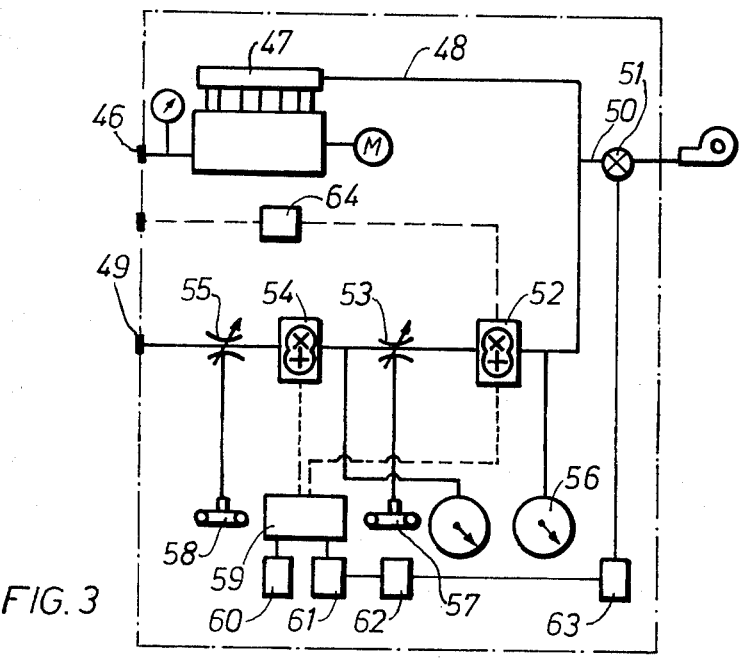
FIG. 3 shows a third embodiment in the form of a portable measurement unit.

In FIG. 3, the portable measurement unit consists of an in-feed connection 46, which can be connected by means of a flange to a feed pipe (not shown) and which leads away from a storage container. The in-feed connection 46 opens into a dosing pump 47; from the pump a pipe 48 leads to a mixing head (not shown). The pipe 48 ends in a connection flange 49. A gas pipe 50 with a regulator valve 51 opens between the dosing pump 47 and a gear flowmeter 52 into the pipe 48. The adjustable throttle valve 53 which is connected downstream, is followed by a second gear flowmeter 54. A second adjustable throttle valve 55 is arranged between the flow meter 54 and the connection flange 49. A manometer 56 is arranged before the first gear flowmeter 52. An adjusting device 57 serves to adjust the throttle valve 53. A further adjusting device 58 is provided for the second throttle valve 55. The gear flowmeters 52, 54 are connected to a differential value indicator unit, into which the quantity indicator units for the gear flowmeters 52, 54 are integrated. An ideal value indicator 60 is connected to the differential value indicator unit 59. The throttle valve 51 can be controlled via a measurement value converter 61, regulator 62 and servo-motor 63 as a function of the comparison of the indicated differential value with the ideal value and thus the gas charge of the reaction components can be controlled. The flowmeter 52 and the corresponding flow-meter for the second reaction component (not shown) are connected to the indicator unit 64 for indicating the volumetric ratio of the two components.

This apparatus can be coupled to existing machines so that it can be used for the measurement of the gas charge in more than one machine.

Figure 4:
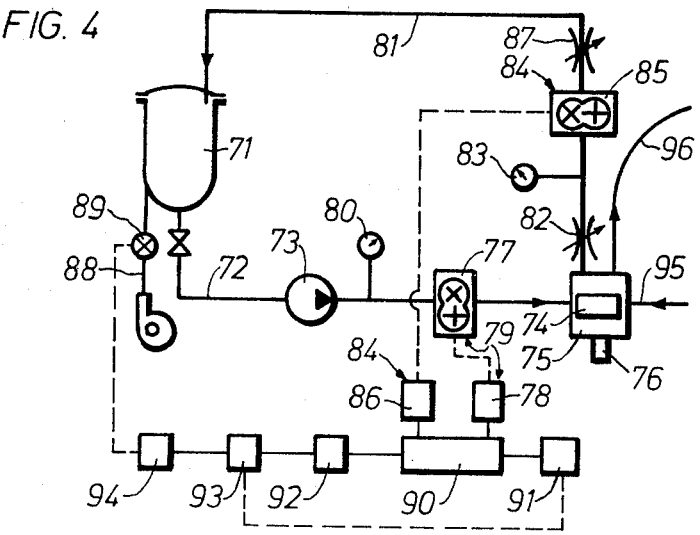
FIG. 4 shows a fourth embodiment having return flow pipes.

In FIG. 4, a pipe 72, in which a dosing pump 73 is arranged, leads from a storage container 71 to a mixing chamber 74 of a mixing head 75, which is provided with an outlet 76. Between dosing pump 73 and mixing head 75 there is arranged a gear flowmeter 77, which together with the indicator unit 78 constitutes the first volumetric flowrate measurement unit 79. A manometer 80 indicates the pressure in the pipe 72 downstream of the dosing pump 73. In the return flow pipe 81 there is arranged an adjustable throttle valve 82 and a second manometer 83, together with a second volumetric flowrate measurement unit 84 consisting of gear flowmeter 85 and indicator unit 86. The return flow pipe 81 is provided with a further throttle valve 87 and opens into the storage container 71. A gas pipe 88 in which there is arranged a throttle valve 89 opens into the storage container 71. The indicator units 78, 86 are connected to a differential value indicator unit which in turn is connected to an ideal value indicator 91. The regulator valve 89 is controlled via a measurement value converter 92, regulator 93 and servo-motor 94, so as to be able to adjust or correct the gas charge. In addition, regulator 93 is also connected to the ideal value indicator 91. The pipe 95 for the isocyanate component also leads to the mixing head 75; and accordingly, a second return flow pipe 96 leads from the mixing head.

The method of operation of the apparatus according to FIG. 4 is similar to that of the apparatus according to FIG. 1. The reaction component, a polyol, leaves the storage container 71 through pipe 72. The dosing pump 73 brings the polyol up to a pressure of, e.g., approximately 100 bars, which is indicated by the manometer 80. At this pressure, the volumetric flowrate is measured by means of the gear flowmeter 77 and indicated by the unit 78 at, e.g., 10.03 liters/minute. In the throttle valve 82, the polyol is decompressed to, e.g., approximately 1 bar, and is read from the manometer 83. The second gear flowmeter 85 again measures the volumetric flowrate unit, which is indicated at, e.g., 10.52 liters/minute by indicator unit 86. The differential vaue of 0.49 liters/minute is indicated by the differential value indicator unit 90. This value is characteristic for the gas charge.. It almost agrees with the ideal value of 0.5 liters/minute. If the gas charge were too high, the rotational speed of the drive mechanism of the agitator mechanism 1 would be reduced via the regulation circuit; if it were too low the rotational speed of the drive mechanism would be increased, in order to include more air. An isocyanate is supplied via pipe 95 without gas charge as the second reaction component. The present invention is particularly adapted for the use in the production of polyurethane foam. As is well known in the art such foams are generally produced by reacting organic isocyanates and active hydrogen containing materials in the presence of blowing agents. Preferred active hydrogen materials are hydrogen containing materials such as polyether polyols, polyester polyols and the like. As is known in the art, the foams are produced by mixing two or more streams, one stream containing the isocyanate and one stream containing the active hydrogen containing material.

What is claimed is:

1. A method for the production of reaction mixtures from two or more liquid reaction components comprising charging at least one of the reaction components with a gas, measuring the volumetric flowrate of the gas-charged reaction component at a first pressure level, bringing the gas charged reaction component to a second pressure level, measuring the volumetric flowrate at said second pressure level whereby the differential value of the measured volumetric flowrate is a measurement for the gas charge and mixing the gas charged component with the remaining reaction components.

2. A method according to claim 1, wherein the reaction components are recirculated during pause times, in which mixing does not take place, and wherein the second measurement of the volumetric flowrate takes place during the recirculation.

3. A method according to claim 1 wherein the first pressure level is higher than the second.

4. A method according to claim 1, wherein the first pressure level is lower than the second.

5. A method according to claim 1, wherein the differential value of the volumetric flowrates measured is compared with a predetermined ideal value and the quantity of gas to be added is regulated so as to adhere to the ideal value.

6. In an improved apparatus for the production of reaction mixtures from liquid reaction components, in which the apparatus has at least two feed streams carrying the separate reaction components to a mixing head and at least one feed stream has a gas inlet, the improvement wherein said apparatus is provided with a gas charge measurement means comprising a first volumetric flowrate measurement unit in each feed stream having a gas inlet, said first volumetric flowrate measurement unit connected downstream of each gas inlet, a pressure drop unit in each feed stream having a gas inlet, said pressure drop unit connected downstream of each first volumetric flow rate measurement unit, a second volumetric flowrate measurement unit in each feed stream having a gas inlet, said second volumetric flowrate measurement unit connected downstream of each pressure drop unit and upstream of the mixing head, and a differential value indicator connected to each of the first and second volumetric flowrate measurement units.

7. An apparatus according to claim 6, wherein the second volumetric flowrate measurement unit is arranged in a return flow pipe.

8. An apparatus according to claim 6, wherein the pressure drop unit comprises a dosing pump.

9. An apparatus according to claim 6, wherein the pressue drop unit comprises a throttle valve.

10. An apparatus according to claim 6 wherein the differential value indicator is a part of a regulation circuit consisting of an ideal value indicator, a measurement value converter, a regulator, a servo-motor and a regulating unit connected to the gas feed mechanism.

11. An apparatus according to claim 6 wherein the pressure drop unit is a variable pressure drop unit, and said gas charge measurement means is removable.

12. An apparatus according to claim 6 wherein the pressure drop unit and second volumetric flowrate measurement unit are arranged in a return flow pipe.

* * * * *